US012811891B2

(12) United States Patent
Tesanovic

(10) Patent No.: US 12,811,891 B2
(45) Date of Patent: Nov. 24, 2026

(54) METHOD AND APPARATUS FOR FLOW CONTROL

(71) Applicant: Samsung Electronics Co., Ltd., Suwon-si (KR)

(72) Inventor: Milos Tesanovic, Staines (GB)

(73) Assignee: Samsung Electronics Co., Ltd., Suwon-si (KR)

( * ) Notice: Subject to any disclaimer, the term of this patent is extended or adjusted under 35 U.S.C. 154(b) by 516 days.

(21) Appl. No.: 18/040,579

(22) PCT Filed: Aug. 5, 2021

(86) PCT No.: PCT/KR2021/010318
§ 371 (c)(1),
(2) Date: Feb. 3, 2023

(87) PCT Pub. No.: WO2022/031068
PCT Pub. Date: Feb. 10, 2022

(65) Prior Publication Data

US 2023/0284083 A1 Sep. 7, 2023

(30) Foreign Application Priority Data

Aug. 5, 2020 (GB) ...................................... 2012202

(51) Int. Cl.
*H04L 47/30* (2022.01)
*H04L 47/125* (2022.01)

(52) U.S. Cl.
CPC ............ *H04L 47/30* (2013.01); *H04L 47/125* (2013.01)

(58) Field of Classification Search
None
See application file for complete search history.

(56) References Cited

U.S. PATENT DOCUMENTS 8,248,941 B2 8/2012 Teyeb et al.
9,392,481 B2 7/2016 Sun et al.
(Continued)

FOREIGN PATENT DOCUMENTS

WO 2009/095814 A1 8/2009
WO 2014/145845 A1 9/2014
(Continued)

OTHER PUBLICATIONS

Ericsson, "Correction to TS 38.331 for IAB WI", 3GPP TSG-RAN WG2 Meeting #110-e, Jun. 25, 2020, R2-2006429, 820 pages.
(Continued)

*Primary Examiner* — Lonnie V Sweet

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services.

There is disclosed a method for flow control in a network including a first node, a second node and a third node, wherein the second node is a child node of the first node and the third node is a child node of the second node. The method comprises: receiving, by the first node from the second node, flow control feedback information, wherein the flow control feedback information comprises information on a status of the third node and/or a status of a link between the second node and the third node.

6 Claims, 6 Drawing Sheets

(56) References Cited

U.S. PATENT DOCUMENTS

| | | | | |
|---|---|---|---|---|
| 10,608,939 | B1 * | 3/2020 | Kim | H04L 43/062 |
| 11,419,010 | B2 | 8/2022 | Zhu et al. | |
| 11,425,600 | B2 | 8/2022 | Zhu et al. | |
| 2012/0052866 | A1 * | 3/2012 | Froehlich | H04W 8/04 455/445 |
| 2012/0236782 | A1 | 9/2012 | Bucknell et al. | |
| 2014/0328182 | A1 * | 11/2014 | Gao | H04W 76/15 370/236 |
| 2014/0362695 | A1 | 12/2014 | Ho et al. | |
| 2019/0007328 | A1 | 1/2019 | Karaki et al. | |
| 2020/0137611 | A1 * | 4/2020 | Majmundar | H04W 28/0284 |
| 2021/0007011 | A1 | 1/2021 | Zhu et al. | |
| 2021/0022040 | A1 | 1/2021 | Zhu et al. | |
| 2021/0377787 | A1 | 12/2021 | Zhuo et al. | |
| 2022/0151006 | A1 * | 5/2022 | Muhammad | H04W 76/20 |
| 2022/0232414 | A1 * | 7/2022 | Wu | H04L 47/267 |
| 2023/0075817 | A1 * | 3/2023 | Wang | H04W 28/0278 |

FOREIGN PATENT DOCUMENTS

| | | | |
|---|---|---|---|
| WO | 2019/184890 | A1 | 10/2019 |
| WO | 2019/192535 | A1 | 10/2019 |
| WO | 2020/164597 | A1 | 8/2020 |

OTHER PUBLICATIONS

International Search Report dated Nov. 5, 2021 in connection with International Patent Application No. PCT/KR2021/010318, 4 pages.

Written Opinion of the International Searching Authority dated Nov. 5, 2021 in connection with International Patent Application No. PCT/KR2021/010318, 5 pages.

United Kingdom Intellectual Property Office, "Examination Report under Section 18(3)," issued Oct. 20, 2022, in connection with United Kingdom Patent Application No. GB2012202.4, 5 pages.

United Kingdom Intellectual Property Office, "Examination Report under Section 18(3)," issued Jan. 11, 2023, in connection with United Kingdom Patent Application No. GB2012202.4, 3 pages.

United Kingdom Intellectual Property Office, "Search Report," issued Dec. 11, 2020, in connection with United Kingdom Patent Application No. GB2012202.4, 10 pages.

Samsung, "Downlink hop-by-hop flow control," 3GPP TSG-RAN WG2 #108, Reno, Nevada, USA, Oct. 14-18, 2019, R2-1915267, 4 pages.

Office Action issued Apr. 2, 2026, in connection with Korean Patent Application No. 10-2023-7004105, 10 pages.

Galvez et al., "A Feedback-based Adaptive Online Algorithm for Multi-Gateway Load-Balancing in Wireless Mesh Networks," IEEE, Jun. 14, 2010, 9 pages.

* cited by examiner

FIG. 2

| | | | | | |
|---|---|---|---|---|---|
| D/C | PDU Type | R | R | R | Oct 1 |
| BH RLC channel ID | | | | | Oct 2 |
| BH RLC channel ID (cont.) | | | | | Oct 3 |
| Available Buffer Size | | | | | Oct 4 |
| Available Buffer Size (cont.) | | | | | Oct 5 |
| Available Buffer Size (cont.) | | | | | Oct 6 |
| BH RLC channel ID | | | | | Oct 7 |
| BH RLC channel ID (cont.) | | | | | Oct 8 |
| Available Buffer Size | | | | | Oct 9 |
| Available Buffer Size (cont.) | | | | | Oct 10 |
| Available Buffer Size (cont.) | | | | | Oct 11 |

| | | | | | | |
|---|---|---|---|---|---|---|
| D/C | PDU Type | | R | R | R | Oct 1 |
| Routing ID | | | | | | Oct 2 |
| Routing ID (cont.) | | | | | | Oct 3 |
| Routing ID (cont.) | | R | R | R | R | Oct 4 |
| Available Buffer Size | | | | | | Oct 5 |
| Available Buffer Size (cont.) | | | | | | Oct 6 |
| Available Buffer Size (cont.) | | | | | | Oct 7 |
| Routing ID | | | | | | Oct 8 |
| Routing ID (cont.) | | | | | | Oct 9 |
| Routing ID (cont.) | | R | R | R | R | Oct 10 |
| Available Buffer Size | | | | | | Oct 11 |
| Available Buffer Size (cont.) | | | | | | Oct 12 |
| Available Buffer Size (cont.) | | | | | | Oct 13 |

METHOD AND APPARATUS FOR FLOW CONTROL

CROSS-REFERENCE TO RELATED APPLICATIONS

This application is a 371 of International Application No. PCT/KR2021/010318 filed on Aug. 5, 2021, which claims priority to United Kingdom Patent Application No. 2012202.4 filed on Aug. 5, 2020, the disclosures of which are herein incorporated by reference in their entirety.

BACKGROUND

1. Field

Certain examples of the present disclosure provide methods, apparatus and/or systems for flow control. For example, certain examples of the present disclosure provide methods, apparatus and/or systems for DownLink (DL) hop-by-hop flow control within 3$^{rd}$ Generation Partnership Project (3GPP) 5th Generation (5G) New Radio (NR) and NR-based relay networks.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

In 3$^{rd}$ Generation Partnership Project (3GPP) 5th Generation (5G) New Radio (NR), Integrated Access and Backhaul (IAB) is a technique for providing wireless backhaul as an alternative to a fibre backhaul network. An IAB network comprises IAB nodes, at which wireless resources are shared between wireless backhaul and access links. Due to the use of the mmWave spectrum, and consequentially the limited coverage area of an IAB node, the backhaul network is typically implemented as a multi-hop network with backhaul traffic traversing multiple IAB nodes.

Flow control is needed in Integrated Access and Backhaul (IAB) networks to prevent congestion occurring. There are two main types of flow control in relay networks: end-to-end and hop-by-hop.

On the UpLink (UL), resource allocation serves as a form of flow control (the parent node has full control over UL transmissions of its child nodes). For the DownLink (DL), end-to-end flow control mechanisms are already in place. Hop-by-hop DL flow control for IAB is currently being developed in 3GPP. However, several open issues need to be finalized in order to design a working IAB system.

Therefore, what is needed is a technique for flow control, and in particular a technique for DL hop-by-hop flow control within 3GPP 5G NR and NR-based relay networks.

The above information is presented as background information only to assist with an understanding of the present disclosure. No determination has been made, and no assertion is made, as to whether any of the above might be applicable as prior art with regard to the present invention.

It is an aim of certain examples of the present disclosure to address, solve and/or mitigate, at least partly, at least one of the problems and/or disadvantages associated with the related art, for example at least one of the problems and/or disadvantages described herein. It is an aim of certain examples of the present disclosure to provide at least one advantage over the related art, for example at least one of the advantages described herein.

SUMMARY

According to one embodiment of the disclosure, a method for flow control in a network, the network including a first node, a second node and a third node, performed by the second node, wherein the second node is a child node of the first node and the third node is a child node of the second node, the method comprising: transmitting, to the first node, flow control feedback information, wherein the flow control feedback information comprises at least one of information on a status of the third node or information on a status of a link between the second node and the third node.

According to another embodiment of the disclosure, a second node for flow control in a network, the network including a first node, the second node and a third node, wherein the second node is a child node of the first node and the third node is a child node of the second node, the second node comprising: a transceiver; and at least one processor configured to: control the transceiver to transmit, to the first node, flow control feedback information, wherein the flow control feedback information comprises at least one of information on a status of the third node or information on a status of a link between the second node and the third node.

Embodiments or examples disclosed in the description and/or figures falling outside the scope of the claims are to be understood as examples useful for understanding the present invention.

Other aspects, advantages, and salient features of the invention will become apparent to those skilled in the art from the following detailed description taken in conjunction with the accompanying drawings.

According to an embodiments of present disclosure apparatus and/or systems for DownLink (DL) hop-by-hop flow control in a NR wireless network is provided.

BRIEF DESCRIPTION OF THE DRAWINGS

FIG. 2 illustrates examples of control PDUs for two types of flow control feedback (per routing ID and per BH channel);

DETAILED DESCRIPTION

Figure 1:
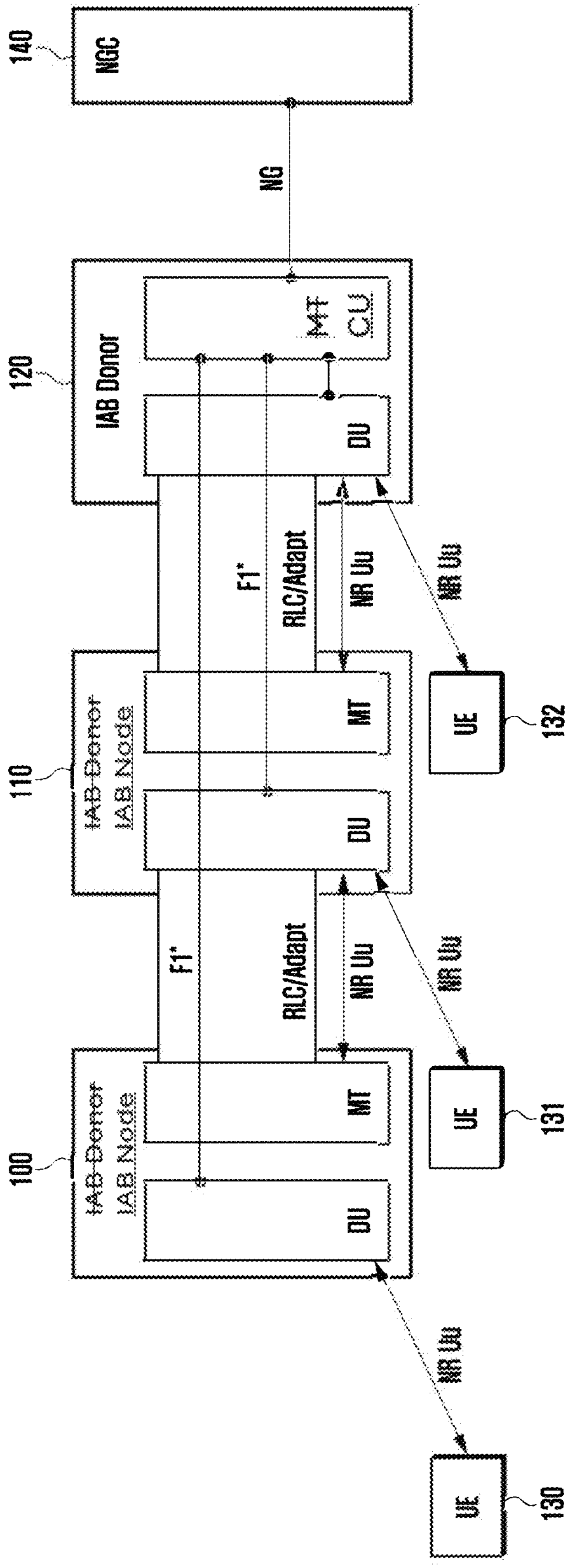
FIG. 1 illustrates one example architecture for multi-hop backhauling (source TR 38.874)

The following description of examples of the present disclosure, with reference to the accompanying drawings, is provided to assist in a comprehensive understanding of the present invention, as defined by the claims. The description includes various specific details to assist in that understanding but these are to be regarded as merely exemplary. Accordingly, those of ordinary skill in the art will recognize that various changes and modifications of the examples described herein can be made.

The same or similar components may be designated by the same or similar reference numerals, although they may be illustrated in different drawings.

Detailed descriptions of techniques, structures, constructions, functions or processes known in the art may be omitted for clarity and conciseness, and to avoid obscuring the subject matter of the present disclosure.

The terms and words used herein are not limited to the bibliographical or standard meanings, but, are merely used to enable a clear and consistent understanding of the examples disclosed herein.

Throughout the description and claims, the words "comprise", "contain" and "include", and variations thereof, for example "comprising", "containing" and "including", means "including but not limited to", and is not intended to (and does not) exclude other features, elements, components, integers, steps, processes, functions, characteristics, and the like.

Throughout the description and claims, the singular form, for example "a", "an" and "the", encompasses the plural unless the context otherwise requires. For example, reference to "an object" includes reference to one or more of such objects.

Throughout the description and claims, language in the general form of "X for Y" (where Y is some action, process, function, activity or step and X is some means for carrying out that action, process, function, activity or step) encompasses means X adapted, configured or arranged specifically, but not necessarily exclusively, to do Y.

Features, elements, components, integers, steps, processes, functions, characteristics, and the like, described in conjunction with a particular aspect, embodiment, example or claim are to be understood to be applicable to any other aspect, embodiment, example or claim disclosed herein unless incompatible therewith.

Certain examples of the present disclosure provide methods, apparatus and/or systems for flow control. The following examples are applicable to, and use terminology associated with, 3GPP 5G. For example, certain examples of the present disclosure provide methods, apparatus and/or systems for DL hop-by-hop flow control within 3GPP 5G NR and NR-based relay networks. However, the skilled person will appreciate that the techniques disclosed herein are not limited to these examples or to 3GPP 5G, and may be applied in any suitable system or standard, for example one or more existing and/or future generation wireless communication systems or standards. The skilled person will appreciate that the techniques disclosed herein may be applied in any existing or future releases of 3GPP 5G NR or any other relevant standard.

For example, the functionality of the various network entities and other features disclosed herein may be applied to corresponding or equivalent entities or features in other communication systems or standards. Corresponding or equivalent entities or features may be regarded as entities or features that perform the same or similar role, function, operation or purpose within the network. For example, the functionality of an IAB node in the examples below may be applied to any other suitable type of entity performing functions of a network node.

The skilled person will appreciate that certain examples of the present disclosure may not be directly related to standardization but rather proprietary implementation of some of the Integrated Access and Backhaul (IAB) functions.

The skilled person will appreciate that the present invention is not limited to the specific examples disclosed herein. For example:

- The techniques disclosed herein are not limited to 3GPP 5G.
- One or more entities in the examples disclosed herein may be replaced with one or more alternative entities performing equivalent or corresponding functions, processes or operations.
- One or more of the messages in the examples disclosed herein may be replaced with one or more alternative messages, signals or other type of information carriers that communicate equivalent or corresponding information.
- One or more further elements, entities and/or messages may be added to the examples disclosed herein.
- One or more non-essential elements, entities and/or messages may be omitted in certain examples.

The functions, processes or operations of a particular entity in one example may be divided between two or more separate entities in an alternative example.

The functions, processes or operations of two or more separate entities in one example may be performed by a single entity in an alternative example.

Information carried by a particular message in one example may be carried by two or more separate messages in an alternative example.

Information carried by two or more separate messages in one example may be carried by a single message in an alternative example.

The order in which operations are performed may be modified, if possible, in alternative examples.

The transmission of information between network entities is not limited to the specific form, type and/or order of messages described in relation to the examples disclosed herein.

Certain examples of the present disclosure may be provided in the form of an apparatus/device/network entity configured to perform one or more defined network functions and/or a method therefor. Such an apparatus/device/network entity may comprise one or more elements, for example one or more of receivers, transmitters, transceivers, processors, controllers, modules, units, and the like, each element configured to perform one or more corresponding processes, operations and/or method steps for implementing the techniques described herein. For example, an operation/function of X may be performed by a module configured to perform X (or an X-module). Certain examples of the present disclosure may be provided in the form of a system (e.g. a network) comprising one or more such apparatuses/devices/network entities, and/or a method therefor. For example, in the following examples, a network may include one or more IAB nodes.

It will be appreciated that examples of the present disclosure may be realized in the form of hardware, software or a combination of hardware and software. Certain examples of the present disclosure may provide a computer program comprising instructions or code which, when executed, implement a method, system and/or apparatus in accordance with any aspect, claim, example and/or embodiment disclosed herein. Certain embodiments of the present disclosure provide a machine-readable storage storing such a program.

To satisfy extremely high data rate requirements, the 3GPP 5G NR standard utilises communication frequencies in a relatively high range, from 30 GHz to 300 GHz, corresponding to wavelengths in the millimetre (mm) range (mmWave communication). Such mmWave communication provides a large available bandwidth and high transmission speeds. However, problems with mmWave communication include severe signal path loss and low penetration, resulting in a relatively short transmission range. This in turn requires a greater density of base stations deployment.

Due to the relatively high cost and other difficulties associated with deployment of fibre transport network links, wireless backhauling can be used as an alternative. Integrated Access and Backhaul (IAB), in which a part of the radio resources is used for backhauling, is currently being standardized for 3GPP Rel-16.

According to 3GPP TR 38.874 (e.g. V16.0.0, 2018 December), the backhaul architecture is expected to support multi-hop backhauling in which backhaul traffic is wirelessly relayed by network nodes via one or more hops using mmWave communication. Multi-hop backhauling provides more range extension than single hop. This is especially beneficial for above-6 GHz frequencies due to their limited range. Multi-hop backhauling further enables backhauling around obstacles, e.g. buildings in urban environment for in-clutter deployments.

Also according to TR 38.874, IAB strives to reuse existing functions and interfaces defined for access. In particular, Mobile-Termination (MT), gNB-DU, gNB-CU, UPF, AMF and SMF as well as the corresponding interfaces NR Uu (between MT and gNB), F1, NG, X2 and N4 are used as baseline for the IAB architectures.

The Mobile-Termination (MT) function has been defined as a component of the Mobile Equipment, and is referred to as a function residing on an IAB-node that terminates the radio interface layers of the backhaul Uu interface toward the IAB-donor or other IAB-nodes.

In the present disclosure, the following abbreviations and definitions may be used.

3GPP 3rd Generation Partnership Project
5G 5th Generation
5GC 5G Core
AMF Access and Mobility Management Function
BAP Backhaul Adaptation Layer
BH Backhaul
BSR Buffer Status Report
CE Control Element
CU Central Unit
DL DownLink
DU Distributed Unit
F1 interface between DU and CU
F1-C F1 Control information
F1*-U Modified F1-U (carried over wireless backhaul in IAB)
gNB 5G base station
GTP-U GPRS Tunnelling Protocol
HbH Hop-by-Hop
IAB Integrated Access and Backhaul
ID Identity/Identification
IP Internet Protocol
KPI Key Performance Indicators
LCG Logical Channel Group
LCH Logical Channel
LCP Logical Channel Prioritization
MAC Medium Access Control
MIMO Multiple-Input Multiple-Output
MT Mobile Termination
NG Interface between 5G RAN and Core
NGC Control part of NG
NR New Radio
OAM Operations, Administration and Maintenance
PDCP Packet Data Conversion Protocol
PDU Protocol Data Unit
PER Packet Error Rate
PHY Physical
QoS Quality of Service
RAN Radio Access Network
Rel Release
RLC Radio Link Control
RLF Radio Link Failure
RRC Radio Resource Control
SA mode Stand-Alone mode
SDAP Service Data Adaption Protocol
SMF Session Management Function
SR Scheduling Request
TR Technical Report
UE User Equipment
UL UpLink
UPF User Plane Function URLLC Ultra-Reliable Low Latency Communication Uu Air interface between terminal and base station/access point X2 interface between 2 base stations FIG. 1 illustrates one example architecture for multi-hop backhauling defined in TR 38.874, showing the reference diagram for a two-hop chain of IAB-nodes (100, 110) underneath an IAB-donor (120), where IAB-node (100, 110) and UE (130, 131, 132) connect in SA-mode to an NGC (140).

An IAB-node (100, 110) may be defined as a RAN node that supports wireless access to UEs (130, 131, 132) and wirelessly backhauls the access traffic. An IAB-donor (120) may be defined as a RAN node which provides UE's interface to core network and wireless backhauling functionality to IAB-nodes (100, 110).

The architecture of FIG. 1 leverages CU/DU-split architecture. That is, the IAB donor node (120) comprises a Central Unit (CU) and one or more Distributed Units (DUs), with an interface called F1 between them. The functionality of the IAB donor (120) is divided between the CU (hosting Radio Resource Control (RRC), Service Data Adaption Protocol (SDAP) and Packet Data Conversion Protocol (PDCP), and which terminates the F1 interface connected with the DU) and DU (hosting Radio Link Control (RLC), Medium Access Control (MAC) and Physical (PHY) layers, and which terminates the F1 interface with the CU) logical nodes. The internal structure (CU/DU) of the IAB donor (120) is not visible to other nodes and the 5G core network (5GC). See 3GPP TS 38.401 (e.g. version 15.2.0, Release 15).

In the architecture of FIG. 1, each IAB-node (100, 110) holds a DU and an MT. Via the MT, the IAB-node (100, 110) connects to an upstream IAB-node or the IAB-donor (120). Via the DU, the IAB-node (100, 110) establishes RLC-channels to UEs (130, 131, 132) and to MTs of downstream IAB-nodes. For MTs, this RLC-channel may refer to a modified RLC*. An IAB-node (100, 110) can connect to more than one upstream IAB-node or IAB-donor DU. The IAB-node (100, 110) may contain multiple DUs, but each DU part of the IAB-node (100, 110) has F1-C connection only with one IAB-donor CU-CP.

The IAB-donor (120) also holds a DU to support UEs (130, 131, 132) and MTs of downstream IAB-nodes (100, 110). The IAB-donor (120) holds a CU for the DUs of all IAB-nodes (100, 110) and for its own DU. It is assumed that the DUs on an IAB-node (100, 110) are served by only one IAB-donor (120). This IAB-donor (120) may change through topology adaptation. Each DU on an IAB-node (100, 110) connects to the CU in the IAB-donor (120) using a modified form of F1, which is referred to as F1*. F1*-U runs over RLC channels on the wireless backhaul between the MT on the serving IAB-node and the DU on the IAB-donor (120). An adaptation layer is added—named Backhaul Adaptation Layer, or BAP, in the ongoing normative phase—which performs bearer mapping and routing. It replaces the IP functionality of the standard F1-stack. F1*-U may carry a GTP-U header for the end-to-end association between CU and DU.

The Uu interface represents the interface between the UE (130, 131, 132) and the DU in an IAB node (100, 110). The F1* interface represents the interface between the IAB DU and an upstream CU.

In the architecture of FIG. 1, the DU part of the parent node, acting as access point to the Mobile Termination (MT) part of the child node, does not know the conditions on the egress link of the DU part of the child node. In other words, the DU side of the parent IAB-node may not know the downlink buffer status of the child IAB-node. This is one of the reasons the flow control feedback is required. In other words, flow control is needed in IAB networks to prevent congestion occurring.

In NR Rel-16 IAB, Hop-by-Hop (HbH) flow control feedback is limited to single-hop, and includes available or desired buffer size (in absolute terms, rather than relative terms e.g. percentage). Additionally, the flow control feedback can only be reported for a subset of bearers with the same routing ID (basically bearers heading to the same final destination), or for the entire channel (total buffer status of a channel of the link). Moreover, reporting based on polling and threshold-based reporting are both introduced.

FIG. 2 illustrates the format of the control PDUs for the two types of flow control feedback (per routing ID, and per BH channel).

Figure 3:
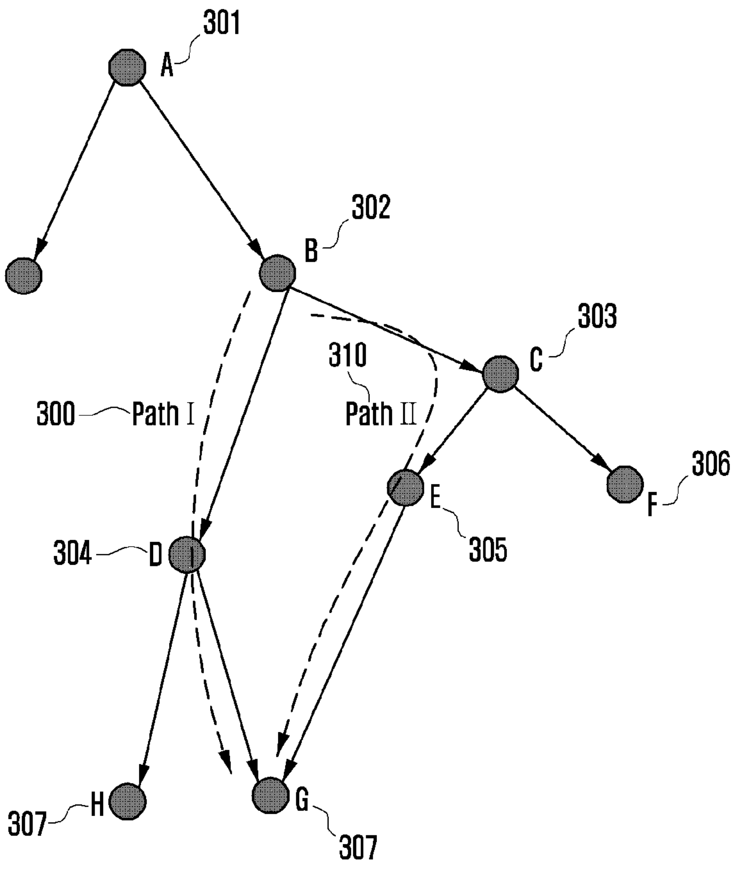
FIG. 3 is a diagram illustrating the parent/child node relationship in a multi-hop network.

FIG. 3 is a diagram illustrating the parent/child node relationship in a multi-hop network (IAB network) including nodes A (301)-G (307). Generally, node B (302) would only receive status of buffers at nodes C (303) and D (304) (its direct child nodes). However, node E (305) may be experiencing congestion on its link to node G (307), due to, for example, changing conditions on the links to node G (307) and UEs attaching directly to node E (305), or due to the outdated information on buffers at node E (305) sent to node C (303) (meaning that node C(303)'s transmission rate towards node E (305) is not optimal). Lack of this information makes it difficult for node B (302) to choose between Path I (300) and Path II (310) for traffic destined for node G (307), or to adjust its own transmission rate towards node C (303) appropriately.

In certain examples of the present disclosure a first node may receive flow control feedback from a second node that is a child node of the first node. The flow control information may comprise first information relating to a status of the second node (e.g. buffer status) and/or a status of the link between the first node and the second node (e.g. congestion status). The first node may receive such information from one or more, or all, of its child nodes. For example, in FIG. 3, node B (302) may receive first information relating to nodes C (303) and/or D (304) and/or links B(302)-C(303) and/or B(302)-D(304).

When there is a third node that is a child node of the second node, the flow control feedback received by the first node may also include second information relating to a status of the third node (e.g. buffer status) and/or a status of the link between the second node and the third node (e.g. congestion status). The first node may receive such information relating to one or more, or all, of the child nodes of its own child nodes. For example, in FIG. 3, node B (302) may receive second information relating to node E (305), node F (306), node G (307) and/or node H (308) and/or links C(303)-E(305), C(303)-F(306), D(304)-G(307) and/or D(304)-H(308).

In certain examples, the flow control feedback information received by the first node may include information relating to the status of nodes and/or links further downstream. For example, in FIG. 3, node A (301)_may receive information relating to one or more, or all, of nodes A (301)-H (308) and one or more, or all, of the links between them.

Various aspects of examples of the present disclosure include the content of the flow control feedback, the circumstances and criteria according to which the flow control feedback is provided or reported, and the action that a node may take in response to receiving the flow control feedback.

Various examples of these aspects are described below. However, the skilled person will appreciate that the present disclosure is not limited to these specific examples. The flow control feedback may comprise any suitable type of information for enabling flow control. The flow control feedback may be provided or reported in response to any suitable set of one or more criteria. A node may take any suitable action(s) in response to receiving the flow control feedback, or may determine not to take any action.

In the following examples, flow control feedback from a child node to a parent node may contain information on the status of the links of the child node to one or more of its own child nodes. This could include:

- A value (e.g. number) indicating the status of the links (e.g. 0—not congested/1—congested; or 0—not congested/1—some congestion/2—congested) together with id of the links. The status of a link may be indicated with any suitable degree of granularity. For example, one of N possible values may indicate N corresponding degrees of congestion.
- The ID of the link could be the universal (e.g. unique per Donor-DU, or per Donor-CU) backhaul link identifier; it could also be a local link identifier such as next hop node id together with the present node id (BAP address/IP address).
- The status of the buffers of the child nodes (of the child node), for example one or more of the following:
- The buffer status may be an indication, for example a numerical indication, (e.g. full/not full, not full/medium occupancy/full, or 10% full/20% full/ . . . 90% full/full/overflowing). The status of a buffer may be indicated with any suitable degree of granularity. For example, one of N possible values may indicate N corresponding buffer levels.
- The buffer status may be actual buffer status in number of bytes.
  - The status of the buffers could refer to buffers at IAB-MT and/or IAB-DU of the child nodes (of the child node).
  - Buffers could be at BAP layer, or RLC layer, or MAC layer, or a combination.
- The buffer status may indicate the remaining buffer space, or the recommended transmission rate.
- A value (e.g. number) indicating a combined/average status of the links (e.g. per single child node, or across all child nodes) and/or a combined/average status of IAB-DU buffers of the child nodes (of the child node).
- Desired data rate as indicated by child nodes (of the child node).
- Reports from nodes further downstream, for example including one or more of the following.
- A report could include any of the above. A report may include the distance from the reporting node in the number of hops.
- A report could include the actual node ID/BAP address/IP address.
- Actual or estimated change in occupancy of own buffers based on reports.

In certain examples, one or more existing control PDUs could be used for reporting the enhanced content according to the examples above. For instance, one of the reserved 'R' bits could be used to indicate that the control PDU carries an estimated change in occupancy of own buffers (rather than actual occupancy). Another reserved 'R' bit could be used to indicate that what is being reported is buffer status of child nodes of the child node. Additional fields could be added to the control PDU to carry, for instance, desired data rate for a node in question or its child nodes, a number of hops to the node to which the report refers, etc., according to above examples.

In certain examples of the present disclosure, the reporting may be done based on different groupings, for example one or more of the following:

- Per routing ID
- Per bearer ID
- Per destination IP address
- Per destination BAP address
- Per specific link ID
- Per RLC channel on a specific link
- Per destination Donor-DU The value of the grouping variable may also be included in the report. For instance, the node may report joint buffer status in one of its child nodes for all the data in that child node with a specified routing ID, together with the routing ID in question. The receiving node (parent of the reporting node) may then get an estimate of how congested the route towards that specific destination (given by the specified routing ID) is.

In cases where there is no universal node identifier, and the parent node can only see the routing ID and the next hop node(s) for that specific routing ID, and (as per examples of the present disclosure) the report from further down the chain on the occupancy of buffers for data with that same routing ID, the parent node can still estimate how congested that route ID is further down the line. It can then start sending data for that same destination via a different path (i.e. different routing ID, which is a unique combination of path ID and destination address, but use the same destination address, over a different path).

The reports may also be shared with the CU, which may then modify the routing tables (as opposed to this being done locally as in the example just described).

In another example, if grouping is done by radio bearers (e.g. per bearer ID) then the receiving node would know if a specific bearer is getting congested e.g. two hops down the line. There may be no congestion in the first hop (on the link to the reporting node), but reports from a reporting node on link/buffer status from nodes further down the chain could indicate that there is in fact congestion at later hops. Therefore, the node receiving the reports may infer that there is no point in continuing to send the data for the same bearer via the same next hop. This information may also be shared with the CU, which may then reconfigure routing tables.

In certain examples of the present disclosure, one or more of the following techniques may be applied:

- grouping radio bearers into radio bearer groups, based on e.g. QoS requirements, type of bearer (data bearer; signaling bearer; node's own traffic e.g. OAM).
- reporting only for a sub-set of radio bearers or a sub-set of radio bearer groups, based e.g. on priority of a bearer/group of bearers, urgency (as measured e.g. by an associated time stamp which may expire).
- reporting only for a sub-set of backhaul links, which can be configurable, based on e.g. past history of congestion, probability of radio link failure, the importance of a certain link (e.g. it's carrying control signaling or OAM).

In certain examples of the present disclosure, a triggering condition(s) for (self-) reporting, by a node, of the flow control feedback may include one or more of the following:

- the node's own buffer, or the buffer of one or more of the node's child nodes, has exceeded a certain (e.g. absolute or relative) threshold.

one or more of the node's child nodes are reporting a preferred transmission rate below a certain threshold.

PER (packet error rate), or a similar rate at any protocol layer, falls below a certain threshold on one or more of the egress links one or more egress links into the node suffer radio link failure, or are likely (predicted) to, based on feedback from the node's child node(s).

reporting can be triggered based on expiration, or likely/imminent expiration, of a time stamp (e.g. on expiry, or a certain time t before the expiry). Flow control feedback may include a time stamp (e.g. indication of validity of information therein), and reporting may be based on a timestamp of a previous report.

reporting can be triggered when the difference between ingress and egress throughputs of the node exceeds a certain threshold reporting can be triggered based on an actual or estimated change in occupancy of the node's buffers (e.g. based on reports from nodes further down the hop-by-hop chain, the actual arrival of data from a parent node, transmission of data to child nodes, and/or estimates of a transmission rate based on at least in part on information received) compared to a most recent report sent to a parent node.

this may also take into account the time elapsed since the most recent report was sent to a parent node, for example by comparing that time to a certain predefined threshold. For example, reporting may be triggered if more than x ms have lapsed since the last report was sent, and optionally if one or more other conditions are satisfied (e.g. if the actual or estimated buffer occupancy has changed by m %).

any of the examples disclosed herein, including the above examples, may be configured for bearers carrying a specific service (e.g. a latency-critical service such as URLLC, or signaling bearers) and/or bearers having a certain priority.

In certain examples, the triggering condition(s) can be set by the Donor-CU, or by the parent node. In certain examples, the triggering conditions may be predefined, for example based on node type (e.g. local vs. wideband node), number of its child nodes, etc.

In certain examples, reporting may be periodic, for example as configured by the parent node (e.g. by using a specific BAP layer Control Element, or CE), or by the CU (e.g. by reconfiguring the node via OAM or RRC).

In certain examples, reporting may be based on polling, for example by the parent node (e.g. triggered by reception of a specific BAP layer Control Element, or CE) or by the CU (e.g. change of node configuration via OAM or RRC). In certain examples, the triggering condition(s) for polling of the flow control feedback may include one or more of the following:

Reconfiguration of the routing table, which the node interprets, will lead to congestion/imbalance.

Increase in transmission rate from the parent node.

PER (packet error rate), or a similar rate at any protocol layer, falls below a certain threshold on one or more of the links.

Topology changes in the wider network.

Change in number of child nodes and/or UEs attaching to the node (e.g. indicating a possible surge in DL traffic).

In certain examples, a node receiving information according to the examples disclosed herein (e.g. IAB-DU of the parent node) may do one or more of the following in response:

use this information to lower a transmission rate, for example one or more of the following:

overall sending rate.

sending rate per bearer.

sending rate per destination.

sending rate per routing ID.

use this information to perform load balancing, for example one or more of the following:

re-route traffic.

drop certain packets if it is determined that they will not be useful/used once they eventually reach their destination.

for example, this determination may be based on an estimated delay to reach destination. This may include cases where there is only one path to the destination and it is congested.

use this information to send feedback including at least part of the information (or a derivation thereof) to the Donor-DU and/or Donor-CU.

Figure 4:
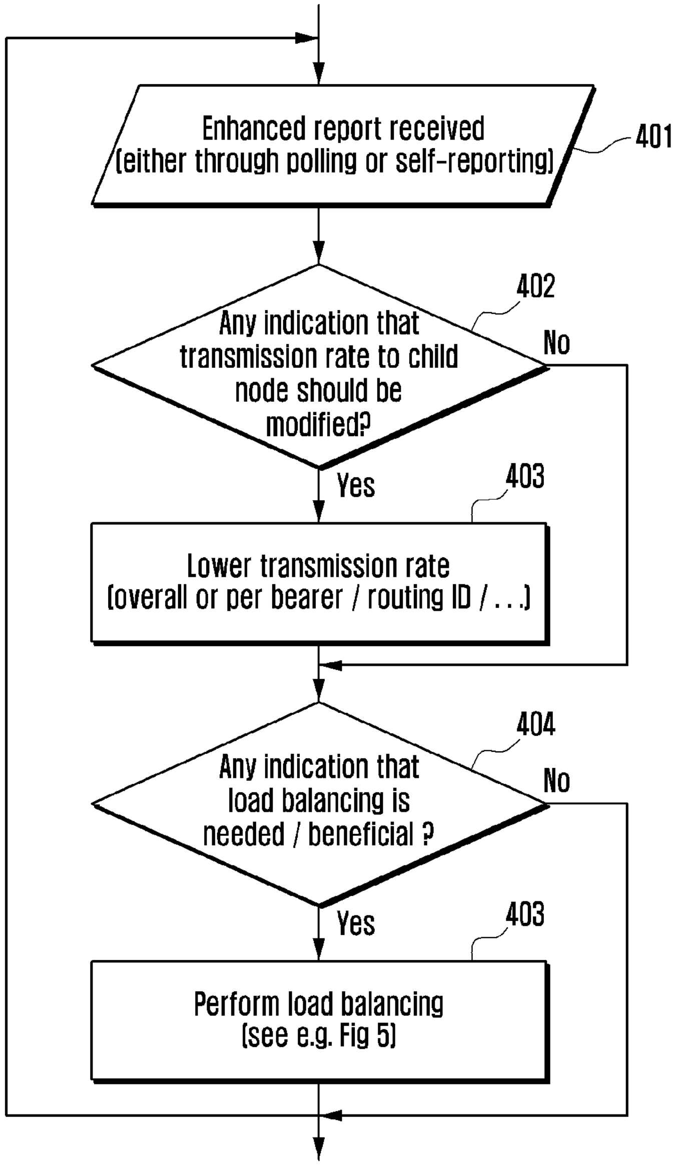
FIG. 4 is a flow chart of an example of the present disclosure.

FIG. 4 is a flow chart of an example of the present disclosure.

In a first step 401, a report is received (e.g. by a first node), for example in response to polling (e.g. by the first node) or self-reporting by a second node (e.g. a child node of the first node). For example, the first node receives an enhance report from the second node.

In a second step 402, it is determined (e.g. by the first node) based on the received report whether there is any indication that the transmission rate to a child node should be modified. For example, the first node determines whether there is any indication that the transmission rate to a child node should be modified, based on the received enhance report. If it is determined that the transmission rate should be modified then the method proceeds to a third step 403, otherwise the third step is skipped and the method proceeds directly to a fourth step 404. For example, if it is determined that the transmission rate should not be modified then the method proceeds to the fourth step 404.

In the third step 403, the transmission rate (for example overall or per bearer/routing ID, etc.) is lowered. For example, the transmission rate may be controlled to be lowered per bearer or per routing ID.

In the fourth step 404, it is determined (e.g. by the first node) based on the received report whether there is any indication that load balancing is needed/beneficial. For example, the first node determines whether there is any indication that load balancing is needed/beneficial based on the received enhanced report. If it is determined that load balancing is needed/beneficial then the method proceeds to a fifth step 405, otherwise the fifth step is skipped and the method ends or proceeds back to the first step 401.

In the fifth step 405, load balancing is performed (e.g. by the first node). For example, the first node performs the load balancing.

In certain examples of the present disclosure, the flow control feedback may include a time stamp (indication of validity of information therein). In certain examples, when polling, the network/parent node IAB-DU may include a request indicating how recent the data needs to be. The child node may then provide the information which it already has, or poll its child nodes for more up-to-date information.

For load balancing (local), a node can either be restricted to use of the routing alternatives as pre-determined by the CU, or it can make local decisions.

Figure 5:
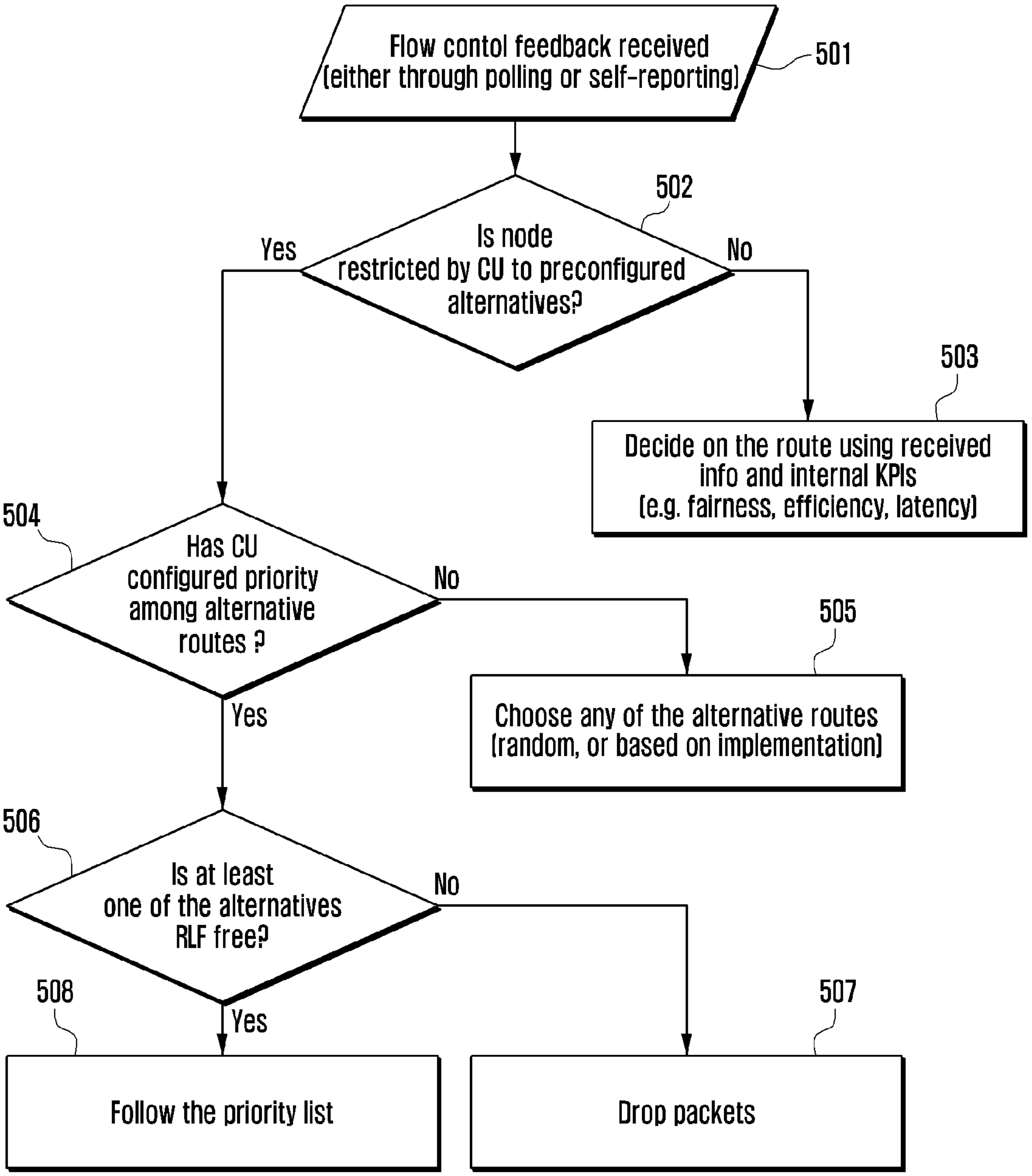
FIG. 5 is a flow chart of another example of the present disclosure.

FIG. 5 is a flow chart of an example of the present disclosure for load balancing.

In a first step 501, flow control feedback is received (e.g. by a first node), for example in response to polling (e.g. by the first node) or self-reporting by a second node (e.g. a child node of the first node). For example, the first node receives an enhance report from the second node.

In a second step 502, it is determined (e.g. by the first node or another network entity) whether or not a node (e.g. the first node) is restricted by CU to preconfigured alternatives.

If the node is not restricted, then in a third step 503 the route is decided (e.g. by the first node or another network entity) using received information and internal KPIs (e.g. fairness, efficiency, latency).

On the other hand, if the node is restricted, then in a fourth step 504 it is determined (e.g. by the first node or another network entity) whether or not CU has configured priority among alternative routes.

If CU has not configured priority, then in a fifth step 505 any of the alternative routes (random, or based on implementation) may be chosen (e.g. by the first node or another network entity).

On the other hand, if CU has configured priority, then in a sixth step 506 it is determined (e.g. by the first node or another network entity) whether or not at least one of the alternative RLF is free.

If at least one of the alternative RLF is not free, then in a seventh step 507 packets are dropped (e.g. by the first node). For example, the first node drops the packets.

On the other hand, if at least one of the alternative RLF is free, then in an eighth step 508, the priority list is followed (e.g. by the first node). For example, the first node follows the priority list.

For load balancing (e.g. centralized), certain examples of the present disclosure may feed-back information on flow control to CU.

Figure 6:
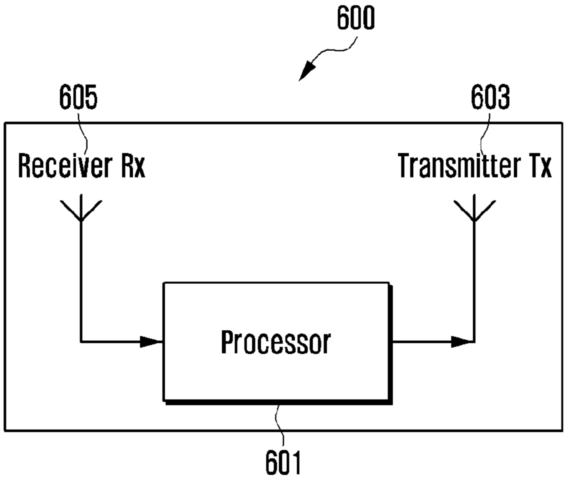
FIG. 6 is a block diagram of an exemplary network entity that may be used in examples of the present disclosure.

FIG. 6 is a block diagram of an exemplary network entity (e.g. IAB Node or IAB Donor) that may be used in examples of the present disclosure. The skilled person will appreciate that the network entity illustrated in FIG. 6 may be implemented, for example, as a network element on a dedicated hardware, as a software instance running on a dedicated hardware, or as a virtualised function instantiated on an appropriate platform, e.g. on a cloud infrastructure.

The entity 600 comprises a processor (or controller) 601, a transmitter 603 and a receiver 605. The receiver 605 is configured for receiving one or more messages from one or more other network entities. The transmitter 603 is configured for transmitting one or more messages to one or more other network entities. The transmitter 603 and the receiver 605 may be referred to as a transceiver or a communicator or a communication unit according to various embodiments.

The processor 601 is configured for performing operations as described above. In the disclosure, the processor 601 may be defined as a circuit, an application-specific integrated circuit, or a controller.

Certain examples of the present disclosure provide a method for flow control in a network including a first node, a second node and a third node, wherein the second node is a child node of the first node and the third node is a child node of the second node, the method comprising: receiving, by the first node from the second node, flow control feedback information, wherein the flow control feedback information comprises information on a status of the third node and/or a status of a link between the second node and the third node.

In certain examples, the flow control feedback information may comprise information indicating one or more of: the status of the link and an ID of the link; the status of a buffer (e.g. IAB-DU buffer) of the third node; a combined/average status of the link; a combined/average status of a buffer (e.g. IAB-DU buffer) of the third node; and a status report relating to a child node of the third node.

In certain examples, the information indicating the status of the link may comprise one or more values indicating one or more of: “not congested”, “congested”, “some congestion”, and a degree of congestion.

In certain examples, the information indicating the status of the buffer may comprise one or more values indicating one or more of: “full”, “not full”, used buffer space, remaining buffer space, and recommended transmission rate.

In certain examples, the status report may include one or more of: a link status, a buffer status, combined/average link status, combined/average buffer status, a distance from the reporting node, node ID, and node address.

In certain examples, the flow control feedback information may be grouped according to one or more of the following: per routing ID; per bearer ID; per destination IP address; per destination BAP address; per specific link ID; per channel on a specific link; and per destination Donor-DU.

In certain examples, the method may further comprise grouping radio bearers into radio bearer groups (e.g. based on QoS requirements and/or type of bearer).

In certain examples, the flow control feedback information may comprise information only for a sub-set of radio bearers and/or a sub-set of radio bearer groups.

In certain examples, the flow control feedback information may comprise information only for a sub-set of backhaul links.

In certain examples, the second node transmits the flow control feedback information to the first node based on one or more triggering conditions.

In certain examples, the one or more triggering conditions may include one or more of the following: a buffer level of the second node or a buffer level of the third node has exceeded a certain threshold; the third node has reported a preferred transmission rate below a certain threshold; a packet error rate has fallen below a certain threshold on one or more egress links of the third node; one or more egress links of the third node has suffered a radio link failure or is predicted to suffered a radio link failure based on feedback information from child nodes of the third node; expiration of a time stamp; and the difference between ingress and egress throughputs of the third node exceeds a certain threshold.

In certain examples, the one or more triggering conditions may be configured for bearers carrying a specific service and/or bearers having a certain priority.

In certain examples, the second node may transmit the flow control feedback information periodically (e.g. configured by the first node or by a CU).

In certain examples, the second node may transmit the flow control feedback information in response to polling (e.g. by the first node or by a CU).

In certain examples, the polling may be done based on one or more triggering conditions, including one or more of the following: reconfiguration of a routing table; an increase in a transmission rate from the first node; a packet error rate, or a similar rate at any protocol layer, falls below a certain threshold on one or more links; a topology change in a wider network; and a change in a number of child nodes of the first node and/or UEs attaching to the first node.

In certain examples, the method may further comprise performing, by the first node, based on the received flow control feedback information, one or more of: lowering a transmission rate to the second node; and performing load balancing.

In certain examples, the transmission rate may comprises one or more of: an overall sending rate; a sending rate per bearer; a sending rate per destination; and a sending rate per routing ID.

In certain examples, the load balancing may comprise one or more of: re-routing traffic; and dropping certain packets.

In certain examples, a packet may be dropped based on a determination that the packet will not be useful and/or will not be used once it reaches its destination (e.g. based on an estimated delay of the packet to reach its destination).

Certain examples of the present disclosure provide a method for flow control in a network including a first node, a second node and a third node, wherein the second node is a child node of the first node and the third node is a child node of the second node, the method comprising: transmitting, by the second node to the first node, flow control feedback information, wherein the flow control feedback information comprises information on a status of the third node and/or a status of a link between the second node and the third node.

Certain examples of the present disclosure provide a first node for flow control in a network including the first node, a second node and a third node, wherein the second node is a child node of the first node and the third node is a child node of the second node, wherein the first node is configured to receive, from the second node, flow control feedback information, wherein the flow control feedback information comprises information on a status of the third node and/or a status of a link between the second node and the third node.

Certain examples of the present disclosure provide a second node for flow control in a network including a first node, the second node and a third node, wherein the second node is a child node of the first node and the third node is a child node of the second node, wherein the second node is configured to transmit, to the first node, flow control feedback information, wherein the flow control feedback information comprises information on a status of the third node and/or a status of a link between the second node and the third node.

Certain examples of the present disclosure provide a network comprising a first node and a second node according to the above examples.

Certain examples of the present disclosure provide a computer program comprising instructions which, when the program is executed by a computer, cause the computer to carry out any method disclosed herein. Certain examples of the present disclosure provide a computer-readable data carrier having stored thereon such a computer program.

While the invention has been shown and described with reference to certain examples, it will be understood by those skilled in the art that various changes in form and detail may be made therein without departing from the scope of the invention, as defined by the appended claims.

The invention claimed is:

1. A method performed by a first node for a flow control in a network, the method comprising:

receiving, from a second node, flow control feedback information including a routing identifier and information on buffer status associated with the second node, wherein the second node is a child node of the first node;

identifying whether a first link associated with the second node is congested based on the flow control feedback information received from the second node; and performing a load balancing based on the identification that the first link associated with the second node is congested, wherein the flow control feedback information is control protocol data unit (PDU) for flow control feedback per routing identity.

2. The method of claim 1, wherein the load balancing comprises rerouting traffic across a second link.

3. The method of claim 1, wherein the flow control feedback information includes information on buffer status associated with a third node, and wherein the third node is a child node of the second node or a child node of the first node.

4. A first node for a flow control in a network, the first node comprising:

at least one transceiver; and at least one processor communicatively coupled to the at least one transceiver, the at least one processor configured to:

receive, from a second node, flow control feedback information including a routing identifier and information on buffer status associated with the second node, wherein the second node is a child node of the first node, identify whether a first link associated with the second node is congested based on the flow control feedback information received from the second node, and perform a load balancing based on the identification that the link associated with the second node is congested, wherein the flow control feedback information is control protocol data unit (PDU) for flow control feedback per routing identity.

5. The first node of claim 4, wherein the load balancing comprises rerouting traffic across a second link.

6. The first node of claim 4, wherein the flow control feedback information includes information on buffer status associated with a third node, and wherein the third node is a child node of the second node or a child node of the first node.

* * * * *